Patented Feb. 6, 1951

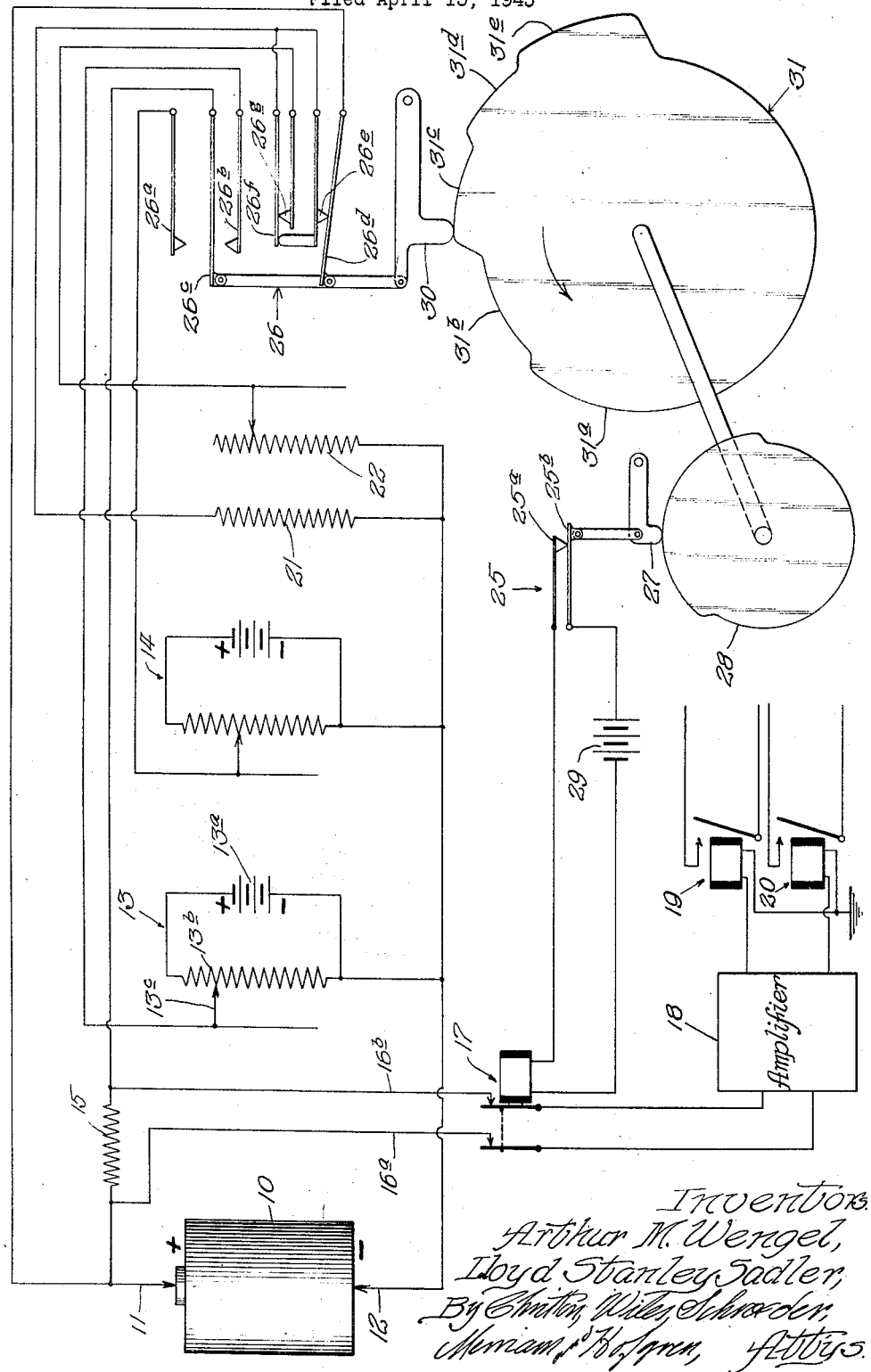

2,540,225

UNITED STATES PATENT OFFICE 2,540,225

CELL TESTING APPARATUS

Arthur M. Wengel, Blooming Grove, and Lloyd Stanley Sadler, Madison, Wis., assignors to Ray-O-Vac Company, a corporation of Wisconsin Application April 13, 1945, Serial No. 588,232

2 Claims. (Cl. 209—81)

This invention relates to a cell testing method and apparatus, and more particularly to improved means for effecting certain tests of a dry cell with great rapidity.

One feature of this invention is that it provides means for accurately and quickly effecting voltage tests of a cell by balancing the cell voltage against an appropriate pilot voltage and using any resultant differential voltage to actuate an amplifier which in turn actuates appropriate rejecting mechanism. This enables cells to be tested under both open and closed voltage positions without the delay incident to movement of mechanical meter movements, and with a high degree of accuracy as to within limits of .002 volt.

Another feature of this invention is that it provides means for making both open and closed circuit test of a cell, as a flashlight dry cell, in quick succession; and yet another feature of this invention is that it is adapted to sort cells, rejecting cells above a certain desired maximum voltage in one direction, rejecting cells below a desired minimum voltage in another direction, and passing cells within the range between such minimum and maximum voltages. Other features and advantages of this invention will be apparent from the following specification and the drawing, which comprises a diagrammatic representation, partly schematic and partly in circuit diagram form, of one embodiment of our invention.

Automatic cell testing equipment with which we are familiar has in the past made use of meter movements to indicate the open circuit voltage of the cell under test, and the closed circuit voltage or amperage with a predetermined load, and the desired sorting of the cell into those which passed the test and those which were rejected is effected in accordance with some position of the meter movement or movements. Even though sensitive meter movements are used and their back swing is limited by electrical stops or floating voltages, movement of the meter movement indicating arrangement to final position dependent upon the cell condition being tested is a mechanical movement wherein mechanical inertia must be overcome, and this movement requires relatively appreciable time delays if the sorting is to be accurately accomplished.

We have devised and are here disclosing and claiming a cell testing arrangement which overcomes these and other disadvantages of previous automatic cell testing equipment. In our arrangement the cell condition being used in the particular test, as for example open circuit voltage, is balanced against a predetermined opposing or "bucking" pilot voltage through an indicating voltage developing resistor. If the two voltages are exactly equal no voltage is developed across the resistor, of course; if the cell voltage is higher than the pilot voltage, an indicating voltage is developed across the resistor with a certain polarity; and if the pilot voltage is higher than the cell voltage, an indicating voltage is developed across the resistor in the opposite polarity. This indicating voltage is then applied to the input of a push-pull amplifier, preferably of the direct coupled type, so that the output of the amplifier is both in direction and amplitude determined by the indicating voltage supplied to the input. This output of the amplifier may then be automatically separated and supplied to one or the other of two circuit paths in accordance with its polarity or direction (as by the use of rectifiers in such circuit paths passing the current through one circuit path if it has one polarity and through the other circuit path if it has the opposite polarity); and the amplitude determines whether or not rejecting mechanism for over-voltage or under-voltage is actuated.

Referring now more particularly to the specific embodiment of our invention illustrated in the accompanying drawing, the cell under test, identified as 10, is adapted to be moved into test position and brought automatically into contact with cell contacting elements 11 and 12 by means which are well known in the art and which are not illustrated here, inasmuch as they form no part of the present invention. Two sources of pilot voltages are provided, these being here indicated in general as 13 and 14, respectively. While any appropriate source of a predetermined accurately calibrated pilot voltage may be used, we are illustrating the pilot voltage sources as a couple of standard cells in series and developing a voltage drop across bleeder resistors, as for example the standard cells 13a developing a voltage drop across the resistor 13b, this latter being a potentiometer adapted to provide any predetermined voltage within the limit of the maximum voltage developed across the resistor, in accordance with the setting of the variable contact or potentiometer arm 13c. The arrangement of the other pilot voltage source is identical, and accordingly will not be separately described.

Either of these pilot voltage sources 13 and 14 is adapted to be connected in a series circuit with the cell 10 and an indicating voltage resistor 15, the polarities of the voltages being so arranged that they buck each other in this series circuit, and any voltage drop across the resistor 15 has an amplitude dependent upon the difference between the cell and pilot voltage, and a polarity depending upon which exceeds the other. The indicating voltage existing across the resistor 15 is passed down through a pair of wires 16a and 16b and through a circuit closing arrangement comprising a normally open double pole relay here identified in general as 17. When the contacts of this relay are closed the indicating voltage developed across the resistor 15 is supplied to the input of a direct current push-pull amplifier 18. This amplifier is not illustrated in detail here, as any suitable amplifier of the push-pull type may be used. The preferred amplifier which we have developed for this cell testing is fully illustrated and described in the copending application of Lloyd Stanley Sadler, Serial No. 559,865, filed October 21, 1944, now abandoned. If the output of this push-pull direct current amplifier 18 has one polarity it actuates a relay 19 controlling one rejecting arrangement, which may be of a conventional solenoid operated type adapted to knock the cell out of line to one side; and if the polarity of the amplifier output is in the opposite direction, the other relay 20 is actuated to operate another rejecting mechanism, which may throw the cell out to the other side of the line or conveyor. While any form of separating arrangement may be used to cause actuation of one relay when the output has one polarity and of the other relay when the output has the other polarity, the particular arrangement used in the above-mentioned copending Sadler application employs oppositely arranged rectifiers, so that the relay 19 is actuated when the upper output terminal is positive, for example, and the relay 20 is actuated when the lower output terminal is positive.

In the particular embodiment of our invention which we are illustrating here the pilot voltage provided by the arrangement 13 is first balanced against the cell voltage under what are termed open circuit test conditions, with no load of any kind upon the cell. For a small flashlight cell, for example, the particular run or group being tested might be desired to have an open circuit voltage of 1.56 volts, and in such case the pilot voltage 13 would be set at this value. If it were desired to employ the maximum sensitivity of the apparatus, the amplifier might be so adjusted as to provide just sufficient voltage to actuate one of the relays 19 or 20 upon a difference of .002 volt being applied to its input. In such case, cells over 1.562 volts would be sorted or rejected into an over-voltage group; cells under 1.558 volts would be sorted or rejected into an under-voltage group; and cells between 1.558 and 1.562 volts would be passed. Normally, however, the sensitivity of the amplifier 18 would be so related to the current required to energize the relays 19 and 20 that at least one or two hundredths of a volt difference at the input would be required to actuate the rejecting mechanism. That is, in normal operation the apparatus might sort into an over-voltage group all cells above 1.58 volts, sort into an under-voltage group all cells below 1.54 volts, and pass all cells between 1.54 and 1.58 volts. It will be readily apparent that adjusting the median points is readily effected by adjustment of the potentiometer in the source of pilot voltage; and that adjustment of the rejection point can be determined by the relationship between the gain of the amplifier 18 and the current required to actuate the relays 19 and 20.

In addition to the open circuit voltage test it is also desirable to effect a closed circuit test, the closed circuit test here being shown being a voltage test with the cell under predetermined load conditions. One standard procedure with a smaller-size flashlight cell, for example, is to test its closed circuit voltage when it has a 50 ohm load resistor connected in shunt with it, and that is the closed circuit test which is illustrated here. The voltage across such a load would, of course, be different from the open circuit voltage, and might for example be 1.48 volts. Accordingly, the potentiometer of the pilot voltage source 14 might be adjusted, in the particular example being described, so that the pilot voltage was 1.48 volts. To make the closed circuit test, then, the cell would be put under the desired load and its voltage under the load condition opposed to this second pilot voltage, again across the indicating resistor 15, so that the differences between the cell and pilot voltage in this closed circuit test again result in a difference in polarity and amplitude to the input of the amplifier 18. It has been found that if the predetermined desired load resistor alone is shunted across the dry cell it requires a substantial period, in the neighborhood of one to two seconds or even more, for the closed circuit voltage to stabilize itself at the proper closed circuit value. In order to avoid this undesirable delay in testing, and at the same time to avoid erratic or improper testing under closed circuit conditions, the standard load resistor 21 is initially shunted by a second load resistor here identified as 22 for a very brief period, as one-tenth second, and then this additional resistance is removed from circuit and the closed circuit voltage test made. This procedure results in stabilization of the closed circuit voltage at its proper level in less than two-tenths of a second, greatly speeding up the process of closed circuit testing. This improvement will not be more fully described here, as it forms the subject matter of the copending application of Arthur M. Wengel, Serial No. 584,921, filed March 26, 1945, now abandoned.

Appropriate automatic cell testing can be effected by any means first balancing the open circuit pilot voltage against the open circuit cell voltage and using the indicating voltage developed across the resistor 15 as a source of control voltage determining whether or not the reject mechanism is operative; and then by balancing the closed circuit pilot voltage against the closed circuit voltage of the cell under predetermined load conditions (preferably stabilized as described in the preceding paragraph), and again using the indicating voltage developed across the resistor 15 to determine whether the cell is sorted into a passing group, or an under-voltage or over-voltage group. While this may be accomplished in any of a number of different ways, we are here showing an arrangement which uses cam-actuated relays 25 and 26. The relay 25 comprises a pair of normally open contacts 25a and 25b adapted to be closed when the cam follower 27 is on a high portion (as illustrated) of the cam 28. When the relay contacts 25a and 25b are closed a circuit is completed from a power source here indicated as a battery 29 through the actuating coil of the relay 17, to close the circuit from the indicating resistor 15 to the input of the amplifier 18, this circuit again being opened by opening of the contacts 25a and 25b after the testing procedure is completed and before the cell 10 is removed from the testing position.

The relay 26 is here shown as comprising what may be termed upper and lower sections. The upper section comprises the stationary contacts 26a and 26b, and the intermediate movable contact 26c. The lower section comprises a movable element 26d normally open and out of contact with its cooperating contact element 26e; and another movable contact member 26f normally in contact with its associated contact member 26g. The movable elements 26c and 26d are here shown as linked together and simultaneously movable by movement of a cam follower 30 in contact with various portions of the cam 31, driven at a predetermined speed by any appropriate means, as a synchronous motor, and started in operation each time when a cell, as the cell 10, is in testing position. When the follower 30 is on the portion 31a of the cam surface the movable member 26c is in a middle position, out of contact with both of its cooperating contact members. When the follower 30 drops down into the cam section 31b, the movable element 26c comes into contact with the cooperating switch portion 26b, the contact members 26d and 26e being open at this time. This places the open circuit pilot voltage developed by the pilot voltage arrangement 13 in a series circuit with the cell 10 and the indicating resistor 15, with the cell and pilot voltages bucking each other, so that the input to the amplifier 18 is then indicative of open circuit test conditions. When the cam follower 30 reaches the cam section 31c, as shown in the drawing, the parts are in the position illustrated, the circuit through the resistor 15 being open and a preconditioning load comprising both the resistor 21 (which may be 50 ohms) and the resistor 22 (which may be 10 ohms) being applied to the cell. At the end of a time interval which we prefer to be in the neighborhood of a tenth of a second or slightly less, the cam follower 30 comes into contact with the cam section 31d, and this opens contact between the switch elements 26f and 26g, the switch elements 26c and 26a still remaining out of contact. This results in removal of the preconditioning resistor 22 from the circuit, leaving only the predetermined load resistor 21 shunted across the cell 10. The length of the cam section 31d is such, in relation to the rate of cam rotation, that this condition continues for about .1 second to stabilize the closed circuit voltage, then the cam follower rises onto cam section 31e and, by closing the contacts 26a and 26c, closes a series circuit including the closed circuit voltage from the pilot voltage source 14. The resultant indicating voltage developed across the resistor 15 then actuates the amplifier 18 and determines the sorting action of the rejecting mechanism. If desired, an additional contact on the relay 17 may be used in the wire leading to the contact 26d, to maintain this circuit open prior to the open circuit test, if the cams 28 and 31 should preferably be so related that the relay 17 does not close until a few degrees after the follower 30 has dropped on down to the cam section 31b.

While we have shown and described certain embodiments of our invention, it is to be understood that it is capable of many modifications. Changes, therefore, in the construction and arrangement may be made without departing from the spirit and scope of the invention as disclosed in the appended claims.

We claim:

1. In a cell testing system including sorting means, apparatus of the character described, including: means providing a first pilot voltage; means for comparing the voltage of the cell under test with the first pilot voltage; means providing a second pilot voltage; a predetermined load; means for connecting the load to the cell and comparing its voltage under load with the second pilot voltage; and means for operating the sorting means in accordance with the difference between the cell and pilot voltages in each case.

2. Voltage measuring apparatus for the control of voltaic cell sorting mechanism, comprising contact elements adapted to contact the terminals of a cell, a measuring resistor connected to one of said contact elements, a first source of pilot voltage, a second source of pilot voltage, switch mechanism for successively connecting said sources in series with said contact elements and said measuring resistor, means controlled by said switch mechanism for connecting a load resistor across said contacts concomitantly with the connection of one of said sources to said contact elements and said resistor, an amplifier connected across said measuring resistor, and means for connecting the output of said amplifier to a cell sorting mechanism to be controlled thereby.

ARTHUR M. WENGEL.
LLOYD STANLEY SADLER.

REFERENCES CITED

The following references are of record in the file of this patent:

UNITED STATES PATENTS

| Number | Name | Date |
|---|---|---|
| 819,355 | Leeds et al. | May 1, 1906 |
| 1,832,948 | Schmidt | Nov. 24, 1931 |
| 2,225,231 | Pugh | Dec. 17, 1940 |
| 2,285,482 | Wunsch | June 9, 1942 |

OTHER REFERENCES

Publication by L. Podolsky in "Electronics," July 1933, pages 180, 181, copy in Scientific Library.